United States Patent
Kowalevicz et al.

(10) Patent No.: US 9,503,660 B2
(45) Date of Patent: Nov. 22, 2016

(54) COORDINATED SIMULTANEOUS REAL AND FOURIER PLANE IMAGING SYSTEM AND METHODS

(71) Applicant: RAYTHEON COMPANY, Waltham, MA (US)

(72) Inventors: Andrew M. Kowalevicz, Arlington, VA (US); Frank Allen Birdsong, Jr., Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 515 days.

(21) Appl. No.: 14/089,802

(22) Filed: Nov. 26, 2013

(65) Prior Publication Data

US 2015/0146050 A1 May 28, 2015

(51) Int. Cl.
- *H04N 5/30* (2006.01)
- *G02B 13/00* (2006.01)
- *H04N 5/225* (2006.01)

(52) U.S. Cl.
CPC .............. *H04N 5/30* (2013.01); *G02B 13/00* (2013.01); *H04N 5/2254* (2013.01); *H04N 5/2258* (2013.01)

(58) Field of Classification Search
CPC .... H04N 5/30; H04N 5/2254; H04N 5/2258; G02B 13/00
See application file for complete search history.

(56) References Cited

U.S. PATENT DOCUMENTS

| | | | |
|---|---|---|---|
| 6,153,873 A * | 11/2000 | Wolf | G01N 15/0205 250/208.1 |
| 7,792,423 B2 | 9/2010 | Raskar et al. | |
| 7,923,677 B2 | 4/2011 | Slinger | |
| 2006/0125936 A1* | 6/2006 | Gruhlke | H04N 9/045 348/238 |
| 2013/0016346 A1* | 1/2013 | Romanovsky | G01N 21/9501 356/237.5 |
| 2014/0009759 A1* | 1/2014 | Zhao | G01N 21/9501 356/369 |

* cited by examiner

*Primary Examiner* — Rodney Bonnette
(74) *Attorney, Agent, or Firm* — Lando & Anastasi, LLP

(57) ABSTRACT

Imaging systems and methods for simultaneous real and Fourier plane imaging. In one example, an imaging system includes at least one optical element configured to receive and focus incident electromagnetic radiation from a viewed scene, a first detector positioned at an image plane of the at least one optical element and configured to produce a first image of the viewed scene, and a second detector positioned at a Fourier plane of the at least one optical element and configured to produce a second image of the viewed scene, the first and second detectors configured to receive the electromagnetic radiation and produce the first and second images, respectively. The system may additionally include an optical component, such as a beamsplitter, for example, configured to divide and direct the incident electromagnetic radiation to the first and second detectors.

19 Claims, 4 Drawing Sheets

COORDINATED SIMULTANEOUS REAL AND FOURIER PLANE IMAGING SYSTEM AND METHODS

BACKGROUND

Imaging and optical sensing devices are widely used in both commercial and military applications. Traditional imaging through a single aperture system captures a two-dimensional representation of a three-dimensional field of view. However, such systems are unable to capture significant other details related to the incident rays of light. Obtaining additional optical information at the time of acquisition of the images is desirable since is allows greater post-acquisition image processing applications, such as deblurring or refocusing, for example. Some approaches to capturing additional information from the incoming light rays in optical systems have been explored under the topic of computational imaging. For example, one approach is known as coded aperture imaging which operates on principles similar to the pinhole camera. This technique uses a mask having an array of apertures arranged in a known pattern instead of a single small opening. By selectively blocking the incoming light rays in a known pattern, a coded "shadow" is cast upon a plane of detectors, and properties of the original light source can be deduced from the shadow using computer algorithms. Some examples of coded aperture imaging are discussed in U.S. Pat. No. 7,923,677. Another approach is known as four-dimensional light-field imaging, which is discussed, for example, in U.S. Pat. No. 7,792,423.

SUMMARY OF INVENTION

Aspects and embodiments are directed to imaging methods and systems capable of determining several characteristics of incoming light rays, such as intensity, wavelength, location, and/or azimuth and elevation angle information, for example, without the need for complex optical components, moving parts, or significant computational effort.

According to one embodiment, an imaging system comprises at least one optical element configured to receive and focus incident electromagnetic radiation from a viewed scene, a first detector positioned at an image plane of the at least one optical element and configured to produce a first image of the viewed scene, a second detector positioned at a Fourier plane of the at least one optical element and configured to produce a second image of the viewed scene, the first and second detectors configured to receive the electromagnetic radiation and produce the first and second images, respectively, and an optical component configured to divide and direct the incident electromagnetic radiation to the first and second detectors.

In one example, the at least one optical element is a lens configured to perform a spatial Fourier transform on the incident electromagnetic radiation. In another example, the second detector is a two-dimensional array, including a plurality of detector elements arranged in rows and columns of the two-dimensional array. In one example, the optical component is a beamsplitter. The beamsplitter may be positioned between the lens and the first and second detectors. The imaging system may further comprise a controller coupled to the first and second detectors and configured to receive and process the first and second images to produce a composite third image. In one example, the processor is configured to determine at least one of an azimuth angle and an elevation angle of an object in the viewed scene based on the second image. In another example, the imaging system may further comprise at least one additional optical element positioned in an optical path between the beamsplitter and the first detector. The at least one additional optical element may include a filter. In one example, the filter is a Bayer filter. The imaging system may further comprise an attenuator positioned between the at least one optical element and the first detector, a position of the attenuator being selected based on information obtained from processing of the second image by the processor.

According to another embodiment, an imaging method in an optical imaging system comprises receiving electromagnetic radiation representing a source object, splitting the electromagnetic radiation into a first portion and a second portion, focusing the first portion of the electromagnetic radiation onto a first detector, performing a spatial Fourier transform on the second portion of the electromagnetic radiation and focusing the second portion of the electromagnetic radiation onto a Fourier plane of the optical imaging system, and producing a first image of the source object with a first detector and a second image with a second detector positioned on the Fourier plane.

In one example of the method, the second detector includes a plurality of detector elements arranged in a two-dimensional detector, and the method further comprising determining an azimuth angle of incidence and an elevation angle of incidence of rays of the second position of the electromagnetic radiation, based on detecting the rays with at least one of the plurality of detector elements. The method may further comprise processing the first and second images with a processor coupled to the first and second detectors. In one example, the method further comprises positioning the first and second detectors at a first orientation, wherein producing the first and second images is performed for the first and second detectors positioned at the first orientation, analyzing the second image to determine a first azimuth angle and a first elevation angle of an imaged object relative to the first orientation of the first and second detectors, positioning the first and second detectors at a second orientation, producing a third image of the source object with the first detector and a fourth image with the second detector, analyzing the fourth image to determine a second azimuth angle and a second elevation angle of the imaged object relative to the second orientation of the first and second detectors, and determining a location of the imaged object based on the first and second azimuth angles and the first and second elevation angles.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an imaging system configured to simultaneously perform both "real" or direct imaging and Fourier imaging. With this configuration, the system may capture azimuth and elevation angular information about incoming rays of electromagnetic radiation, as discussed further below. Embodiments of the system may be used to provide improved image quality, and to capture information not otherwise available. For example, according to certain embodiments the system may recover image information that is otherwise obscured by optical interference. Certain embodiments may provide improved effective dynamic range, and reduce effects of "blooming." Additionally, embodiments of the system may be used for targeting and/or determination of three-dimensional image information. Thus, aspects and embodiments of the systems and methods discussed herein may have broad applicability in navigation, targeting, imaging, and situational awareness.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
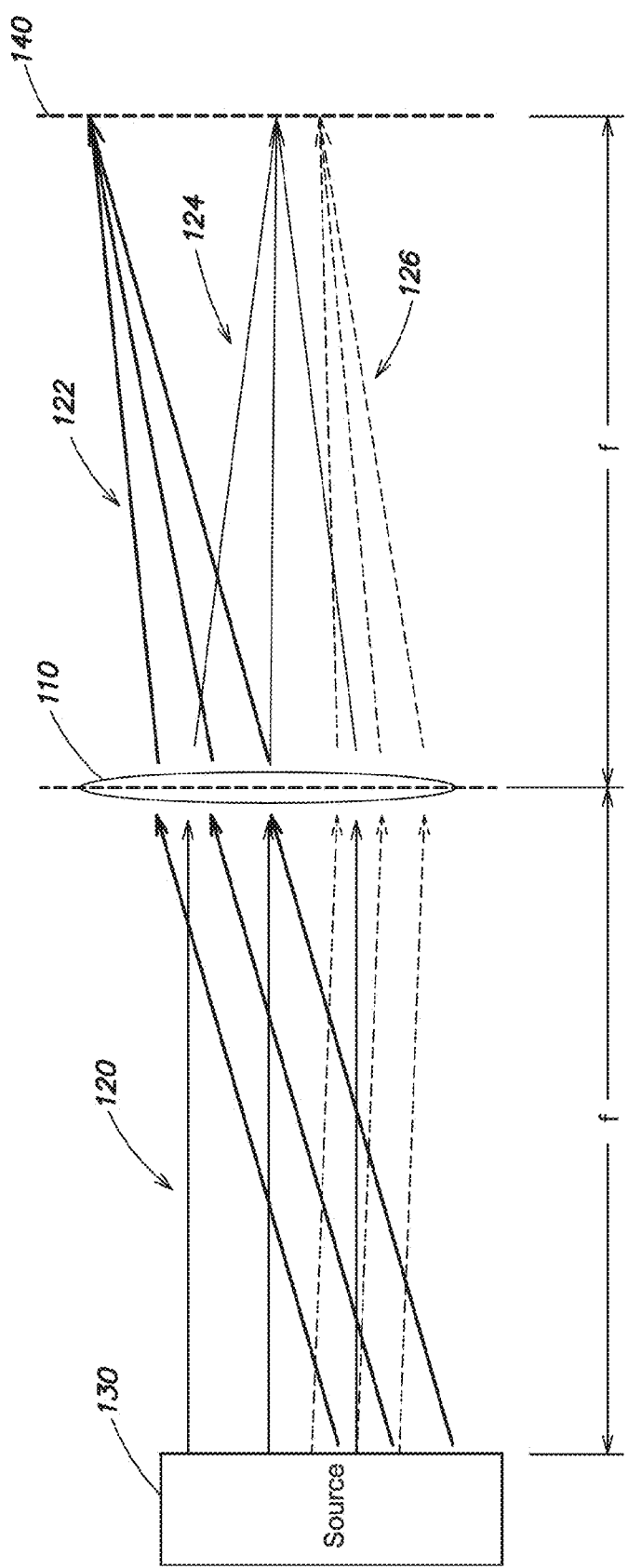
FIG. 1 is a diagram illustrating focus of incident light rays from a source onto the Fourier plane of the focusing optics.
Figure 2:
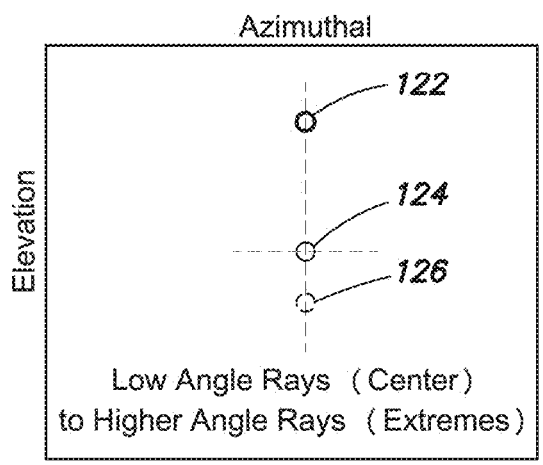
FIG. 2 is a representation of the optical Fourier plane corresponding to FIG. 1 and illustrates the location of the represented light rays impinging on the Fourier plane.

Referring to FIG. 1, in an imaging system including foreoptics 110, electromagnetic radiation 120 from a source 130 is focused by the foreoptics 110 onto a Fourier plane 140 that is positioned a focal length (f) from the foreoptics 110. The foreoptics 110 may include any one or more of numerous reflective and/or refractive optical elements, and the type and configuration of the foreoptics 110 may vary depending, for example, on the application of the imaging system. All rays with the same azimuth and elevation angle pass through the same point in the Fourier plane 140, regardless of their x-y position (with z being the direction of propagation of the electromagnetic radiation, and x and y being orthogonal directions). The foreoptics 110 performs a spatial Fourier transform on the rays of electromagnetic radiation, which is imaged onto the Fourier plane 140. This spatial Fourier transformation maps the rays of electromagnetic radiation into an Azimuth-Angle of Arrival (AOA) versus Elevation-AOA space in the Fourier plane, as illustrated in FIG. 2. All rays arriving from elevation angles of the same value are mapped onto horizontal lines corresponding to their elevation AOA. Similarly, all rays arriving from azimuth angles of the same value are mapped onto vertical lines corresponding to their azimuth AOA. Rays from the same azimuth and elevation angle overlap and map to points on the Fourier plane 140, as shown in FIG. 2. For example, rays 122 overlap at a first point on the Fourier plane 140, rays 124 overlap at a second point, and rays 126 overlap at a third point. Thus, the position of the rays on the Fourier plane 140 provides information regarding the angles of incidence (azimuth and elevation) of the rays of electromagnetic radiation 120 at the foreoptics 110. This also allows selected rays to be examined, filtered, and/or analyzed.

Figure 3:
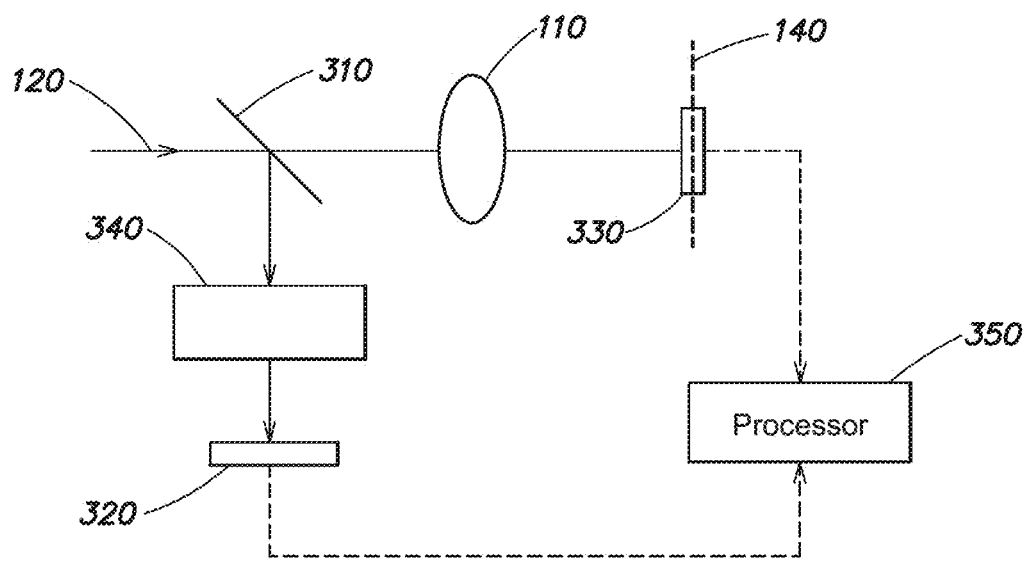
FIG. 3 is a block diagram of one example of an imaging system according to aspects of the invention.

A block diagram of one example of an imaging system according to one embodiment is illustrated in FIG. 3. An optical component 310 is used to divide the incoming rays of electromagnetic radiation 120 into two optical paths. In one example, the optical component 310 is a beamsplitter. Each of the two paths is imaged onto a separate detector array. A first detector array 320 is used to capture the "real-space" information, that is, a reproduction of the objects in the field of view. A second detector 330 positioned at the Fourier plane 140 of the foreoptics 110 is used to capture the Fourier domain information, including the azimuth and elevation angles of the rays of electromagnetic radiation 120. The "real" image captured by the first detector array 320 may provide information such as the intensity of the electromagnetic radiation 120 over the field of view, as well as information about the objects in the field of view. In certain embodiments, one or more additional optical elements 340 may be positioned in the first optical path. For example, the optical element(s) 340 may include relay optics if necessary. In another example, the optical element(s) 340 may include a bayer pattern or other specialized filter which may be used to augment the data obtained from the first detector array 320 with wavelength and/or other information. The two detectors 320, 330 may be coupled to a controller 350, such as a computer, processor, or other device capable of performing image processing functions, that processes the images or image signals produced by the two detectors, optionally for display on a display device (not shown).

As discussed above, in one embodiment the second detector 330 includes a two-dimensional array of detector elements arranged in rows and columns. In the Fourier plane, horizontal rows of detector elements lie along horizontal lines of locations that correspond to rays from given elevation angles. The location of each detector element in a given row corresponds to the azimuthal AOA of rays that impinge on the detector element. Similarly, vertical columns of detector elements lie along vertical lines of locations that correspond to rays from given azimuth angles. The location of each detector element in a given column corresponds to the elevation AOA of rays that impinge on the detector element. Thus each ray that impinges on the second detector 330 may be known in its elevation AOA and its azimuthal AOA by the location of the detecting element within the Fourier plane. The resolution with which the azimuth and/or elevation angles can be determined may depend, at least in part, on the size, pitch, and number of detector elements included in the second detector 330.

The ability to simultaneously capture intensity, wavelength, and azimuth and elevation angle information (which may provide location information about the source 130) may be very beneficial for several applications, including, for example, target recognition and other situational awareness capabilities. For example, the technique of coordinated real and Fourier plane imaging discussed above may allow an object that is obscured by high intensity light to be recovered by processing the imaging in the Fourier plane and eliminating the wavelength and/or angle of incidence that otherwise masks the image in the real plane.

Figure 4:
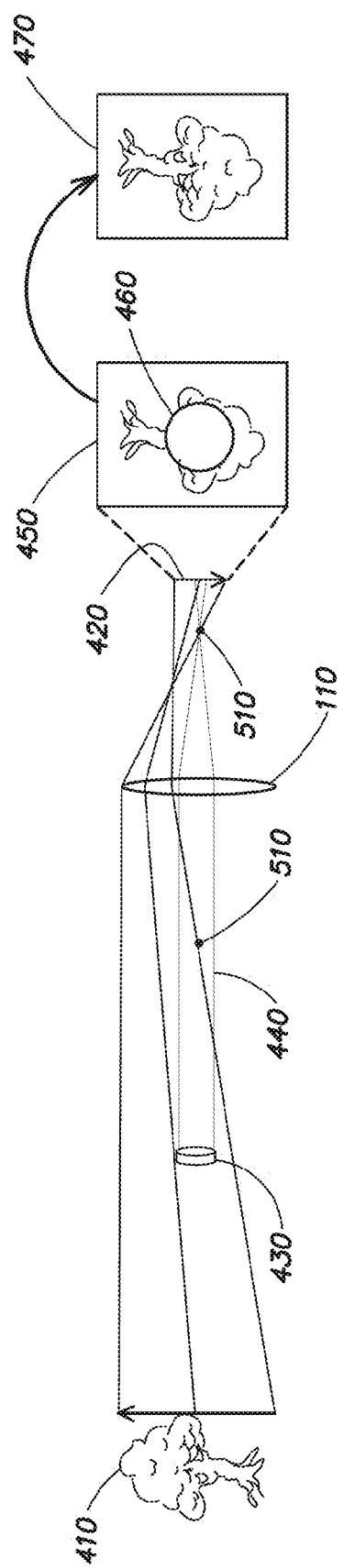
FIG. 4 is a diagram illustrating one example of an obscuration removal application of an imaging system and method according to aspects of the invention.

For example, FIG. 4 illustrates an example in which coordinated real and Fourier plane imaging may be applied for obscuration removal. In this example, the foreoptics 110 image a source object 410 onto the real image plane 420. An obscuring light source 430 produces an obscuring light beam 440 which is both imaged onto the real image plane 420 and the Fourier plane 140. The obscuring light source 430 may be a source of intentional laser interference, such as a laser dazzler, or a source of incidental illumination, such as solar glint or radiation from a flood light, for example. Without intervention, the obscuring light source 430 causes "blooming" in the real image 450 (represented by obscuring circle 460), which degrades the image, and in some circumstances, may render it useless in terms of being able to identify the object 410.

Figure 5:
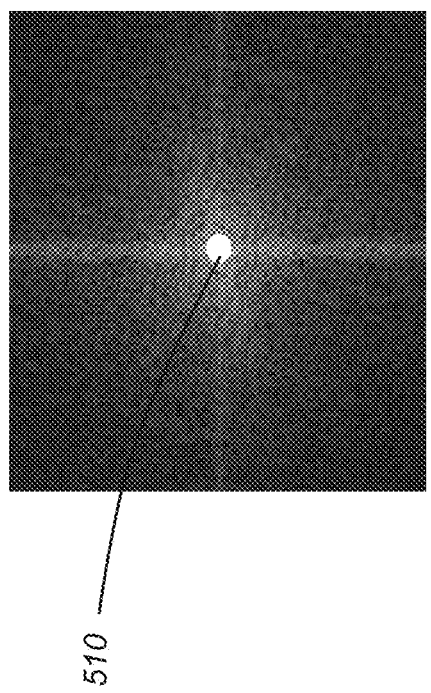
FIG. 5 is a representation of a Fourier plane image obtained by the second detector of the system of FIG. 3.

As discussed above, light rays emanating from the same azimuth and elevation angle are imaged to a common point on the Fourier plane 140. Accordingly, referring to FIG. 5, the beam 440 from the obscuring light source 430 produces a bright central spot 510 in the Fourier plane image. A high pass filter may be applied computationally, for example, by the controller 350, to remove the spot 510. As discussed above, the foreoptics 110 performs a spatial Fourier transform on the rays of electromagnetic radiation from the object. Accordingly, an inverse Fourier transform may be performed on the image obtained at the Fourier plane by the second detector 330 to reconstruct the image in the real domain. According to one embodiment, the controller 350 may perform an inverse Fourier transform on the high-pass filtered Fourier plane image, and combine the result with the real image 450 obtained by the first detector 320. As the images obtained by the two detectors 320, 330 are obtained simultaneously, and the spatial distribution of the object is maintained in both images, information obtained from the Fourier plane image (such as the location of the bright spot 510) may be directly applied to the real image 450. As result, the obscuration 460 caused by the obscuring light source 430 in the real image 450 may be removed since it is filtered out of the Fourier plane image, thereby producing a recovered real image 470 having significantly reduced degradation. This ability may offer protection against the use of laser dazzlers, or other illumination sources that result in intentional or incidental obscuration in battlefield or other applications.

According to another embodiment, an attenuator or "beam block" may be positioned at a selected x-y-z position within the optical system to block the incoming obscuration beam 440. In one example, the attenuator may be positioned at an optimal point to maximize loss of unwanted light and minimize loss of "signal." The x-y-z position of the attenuator may be selected based on computation and information obtained in the real and Fourier planes. As discussed above with reference to FIG. 2, rays from the same azimuth and elevation angle overlap and map to points on the Fourier plane 140. Accordingly, the position of the bright spot 510 in the Fourier plane 140 may reveal information regarding the angle of incidence of the beam 440, and therefore these rays may be blocked in the Fourier plane.

According to another embodiment, information captured from the Fourier plane imaging may be used to identify the location of a feature in the real image 450. This ability may be useful for targeting and a variety of other applications. For example, the orientation, e.g., absolute or relative position, of the sensor system (e.g., detectors 320 and 330 in the system of FIG. 3) may be known, and used in conjunction with the Fourier images to determine the location of a particular imaged feature, such as the location of obscuring light source 430. As discussed above, the position of a certain imaged feature in the Fourier plane provides information about the azimuth and elevation angles of incidence of light from that feature. Thus, for a given first orientation of the sensor system, the relative azimuth and elevation angles of an imaged feature in the Fourier plane can be determined. If the sensor system is moved to a second orientation and a second Fourier plane image is obtained, the feature will appear in the second Fourier plane image at a location corresponding to a second azimuth and elevation angle. Thus, if the first and second orientations of the sensor system are known, the position of the feature in real space, relative to the sensor system, may be "triangulated" from the azimuth and elevation angles corresponding to each orientation. This may be achieved either by knowing the absolute positions of the sensor system for each Fourier plane image obtained, or by knowing the second orientation relative to the first (i.e., by moving the sensor system by a known amount). Thus, by taking two (or more) Fourier plane images of a scene containing a feature of interest with the sensor system in two (or more) corresponding different orientations, the location of the feature in real space can be determined from the combination of the known change in orientation of the sensor system and the angular information obtained from the Fourier images. This approach may provide a mechanism for passive location detection. There is no need for the sensor system to illuminate the scene with an interrogation beam (as is commonly done by active location detection systems) in order to locate an object; rather, the object's location may be determined through observation of the scene in the Fourier plane.

Thus, aspects and embodiments provide optical imaging systems in which simultaneous coordinated real and Fourier plane imaging may be used to provide enhanced imaging capability through the ability to gather more information than is available using conventional imaging systems and methods.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:
1. An imaging system comprising:
at least one optical element configured to receive and focus incident electromagnetic radiation from a viewed scene and to perform a spatial Fourier transform on the incident electromagnetic radiation;

a first detector positioned at a real image plane of the at least one optical element and configured to receive a first portion of the incident electromagnetic radiation and to produce a real image of the viewed scene;

a second detector positioned at a Fourier plane of the at least one optical element and configured to receive a second portion of the incident electromagnetic radiation and to capture Fourier domain information including azimuth and elevation angles of rays of the second portion of the incident electromagnetic radiation to produce a Fourier plane image;

an optical component configured to divide the incident electromagnetic radiation into the first and second portions and to direct the first and second portions to the first and second detectors, respectively; and a controller coupled to the first and second detectors and configured to receive and process the real image and the Fourier plane image to determine at least one of an azimuth angle and an elevation angle of an object in the viewed scene based on the real image and the Fourier plane image.

2. The imaging system of claim 1, wherein the at least one optical element is a lens.

3. The imaging system of claim 2, wherein the second detector is a two-dimensional array detector including a plurality of detector elements arranged in rows and columns of the two-dimensional array.

4. The imaging system of claim 2, wherein the optical component is a beamsplitter.

5. The imaging system of claim 4, wherein the beamsplitter is positioned between the lens and the first and second detectors.

6. The imaging system of claim 5, wherein the controller is configured to process the real and Fourier plane images to produce a composite image.

7. The imaging system of claim 6, further comprising at least one additional optical element positioned in an optical path between the beamsplitter and the first detector.

8. The imaging system of claim 7, wherein the at least one additional optical element includes a filter.

9. The imaging system of claim 8, wherein the filter is a Bayer filter.

10. The imaging system of claim 1, wherein the controller is configured to computationally apply a high pass filter to the Fourier plane image to produce a filtered image, and to perform an inverse Fourier transform on the filtered image.

11. An imaging system comprising:

at least one optical element configured to receive and focus incident electromagnetic radiation from a viewed scene, the at least one optical element being further configured to perform a spatial Fourier transform on the incident electromagnetic radiation;

a first detector positioned at an image plane of the at least one optical element and configured to receive a first portion of the incident electromagnetic radiation and produce a first image of the viewed scene;

a second detector positioned at a Fourier plane of the at least one optical element and configured to receive a second portion of the incident electromagnetic radiation and produce a second image of the viewed scene, the second detector being a two-dimensional array detector including a plurality of detector elements arranged in rows and columns of the two-dimensional array;

a beamsplitter configured to divide the incident electromagnetic radiation into the first and second portions and to direct the first and second portions to the first and second detectors, respectively; and a controller coupled to the first and second detectors and configured to receive and process the first and second images to produce a composite third image and to determine at least one of an azimuth angle and an elevation angle of an object in the viewed scene based on the third image.

12. The imaging system of claim 11, wherein the at least one optical element is a lens.

13. The imaging system of claim 12, wherein the beamsplitter is positioned between the lens and the first and second detectors.

14. The imaging system of claim 11, further comprising at least one additional optical element positioned in an optical path between the beamsplitter and the first detector.

15. The imaging system of claim 14, wherein the at least one additional optical element includes a filter.

16. The imaging system of claim 15, wherein the filter is a Bayer filter.

17. An imaging method in an optical imaging system comprising:

receiving electromagnetic radiation representing a source object;

splitting the electromagnetic radiation into a first portion and a second portion;

focusing the first portion of the electromagnetic radiation onto a first detector;

performing a spatial Fourier transform on the second portion of the electromagnetic radiation and focusing the second portion of the electromagnetic radiation onto a Fourier plane of the optical imaging system;

producing a first image of the source object with the first detector and a second image with a second detector positioned on the Fourier plane, the second detector including a plurality of detector elements arranged in a two-dimensional array; and determining an azimuth angle of incidence and an elevation angle of incidence of rays of the second portion of the electromagnetic radiation based on detecting the rays with at least one of the plurality of detector elements.

18. The imaging method of claim 17, further comprising processing the first and second images with a processor coupled to the first and second detectors.

19. The imaging method of claim 17, further comprising:

positioning the first and second detectors at a first orientation, wherein producing the first and second images is performed for the first and second detectors positioned at the first orientation;

analyzing the second image to determine a first azimuth angle and a first elevation angle of an imaged object relative to the first orientation of the first and second detectors;

positioning the first and second detectors at a second orientation;

producing a third image of the source object with the first detector and a fourth image with the second detector;

analyzing the fourth image to determine a second azimuth angle and a second elevation angle of the imaged object relative to the second orientation of the first and second detectors; and determining a location of the imaged object based on the first and second azimuth angles and the first and second elevation angles.

* * * * *